US 8,879,485 B2

(12) United States Patent
Chun et al.

(10) Patent No.: US 8,879,485 B2
(45) Date of Patent: Nov. 4, 2014

(54) METHOD AND APPARATUS FOR RANDOM ACCESS IN A MULTI-CARRIER WIRELESS COMMUNICATION SYSTEM

(75) Inventors: Sung Duck Chun, Anyang-si (KR); Sung Hoon Jung, Anyang-si (KR); Seung June Yi, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 45 days.

(21) Appl. No.: 13/376,064

(22) PCT Filed: Jun. 7, 2010

(86) PCT No.: PCT/KR2010/003635
§ 371 (c)(1),
(2), (4) Date: Dec. 2, 2011

(87) PCT Pub. No.: WO2010/143851
PCT Pub. Date: Dec. 16, 2010

(65) Prior Publication Data
US 2012/0076042 A1 Mar. 29, 2012

Related U.S. Application Data

(60) Provisional application No. 61/184,833, filed on Jun. 7, 2009, provisional application No. 61/219,366, filed on Jun. 22, 2009.

(51) Int. Cl.
*H04W 4/00* (2009.01)
*H04W 74/08* (2009.01)
(52) U.S. Cl.
CPC .................... *H04W 74/0833* (2013.01)
USPC ......................................... 370/329

(58) Field of Classification Search
CPC ....... H04W 4/00; H04W 40/00; H04W 74/00; H04W 74/0002; H04W 72/00; H04J 1/00
USPC .............. 370/310.2, 328, 331, 310, 313, 329, 370/330, 332, 338, 341, 431, 436, 445
See application file for complete search history.

(56) References Cited

U.S. PATENT DOCUMENTS 7,333,443 B2 * 2/2008 Beckmann et al. ........... 370/254
7,809,073 B2 * 10/2010 Liu ............................... 375/267
7,881,722 B2 * 2/2011 Gunnarsson et al. ......... 455/450

(Continued)

FOREIGN PATENT DOCUMENTS

EP     1 699 197 A1    9/2006
EP     2 173 109 A1    4/2010

(Continued)

*Primary Examiner* — Anh Ngoc Nguyen
(74) *Attorney, Agent, or Firm* — Birch, Stewart, Kolasch & Birch, LLP

(57) ABSTRACT

The present invention relates to a wireless communication system, and discloses a method and an apparatus for performing random access in a multi-carrier wireless communication system. According to one embodiment of the present invention, the method in which user equipment carries out a process for random access to a base station in a multi-carrier wireless communication system comprises: a step of measuring the channel qualities of one or more uplink component carriers, and determining the uplink component carrier having the highest channel quality; a step of selecting a physical random access channel (PRACH) resource on the uplink component carrier having the highest channel quality; and a step of transmitting a random access preamble to the base station using the selected PRACH resource.

12 Claims, 9 Drawing Sheets

(56) References Cited

U.S. PATENT DOCUMENTS

| | | |
|---|---|---|
| 8,059,606 B2 * | 11/2011 | Lee et al. .................. 370/333 |
| 2002/0089957 A1 * | 7/2002 | Viero ........................ 370/336 |
| 2006/0084404 A1 | 4/2006 | Laroia et al. |
| 2009/0052388 A1 * | 2/2009 | Kim et al. .................. 370/329 |
| 2010/0110994 A1 * | 5/2010 | Ratsuk et al. ............. 370/329 |

FOREIGN PATENT DOCUMENTS

| | | |
|---|---|---|
| KR | 10-0401208 B1 | 10/2003 |
| WO | WO 2009/006823 A1 | 1/2009 |

* cited by examiner

METHOD AND APPARATUS FOR RANDOM ACCESS IN A MULTI-CARRIER WIRELESS COMMUNICATION SYSTEM

CROSS REFERENCE TO RELATED APPLICATIONS

This application is the National Phase of PCT/KR2010/003635 filed on Jun. 7, 2010, which claims priority under 35 U.S.C. 119(e) to U.S. Provisional Application Nos. 61/184,833 filed on Jun. 7, 2009 and 61/219,366 filed on Jun. 22, 2009, all of which are hereby expressly incorporated by reference into the present application.

TECHNICAL FIELD

The present invention relates to a wireless communication system, and more particularly, to a method and apparatus for performing a random access in a wireless communication system that supports multi-carriers.

BACKGROUND ART

Generally, one carrier is mainly taken into consideration in a wireless communication system although an uplink and a downlink are set to differ from each other in bandwidth. For instance, based on a single carrier, it may be able to provide a wireless communication system, in which the number of carrier configuring each of uplink and downlink is set to 1 and in which bandwidths of the uplink and downlink are symmetric to each other in general.

According to ITU (international telecommunication union), a technology candidate for IMT-Advanced is requested to support a bandwidth extended more than that of a conventional wireless communication system. Yet, frequency allocation of wider bandwidth is not globally available for many areas except some particular areas. As a technology for using fragmented small bands efficiently, there is an ongoing development of carrier aggregation (e.g., bandwidth aggregation, spectrum aggregation, etc.) to bring the same effect of using a band of logically wider bandwidth by physically bundling a plurality of bands together.

Carrier aggregation is introduced to support an increasing throughput, prevent a cost increase due to an introduction of a broadband RF device, and secure compatibility with a legacy system. Carrier aggregation is the technology for enabling data to be exchanged between a user equipment and a base station through a plurality of bundles of carriers by bandwidth unit defined in a legacy wireless communication (e.g., LTE system in case of LTE-A system, IEEE 802.16e system in case of IEEE 802.16m system). In this case, a carrier of a bandwidth unit defined in a legacy wireless communication system may be called a component carrier (hereinafter abbreviated CC). For instance, the carrier aggregation technology may include a scheme of supporting a system bandwidth up to maximum 100 MHz by making a bundle of maximum 5 CCs despite that one CC supports a bandwidth of 5 MHz, 10 MHz or 20 MHz.

If the carrier aggregation technology is adopted, a user equipment is able to transceive data with a base station through a plurality of uplink component carrier (hereinafter abbreviated UL CCs) and a plurality of downlink CCs (hereinafter abbreviated DL CCs). And, a physical random access channel (PRACH) resource capable of carrying a random access preamble may be set for each of the UL CCs.

The PRACH resource may be set in a time domain and frequency domain. Setting information on this PRACH resource may differ for each UL CC. Since UL CCs use different frequencies (or antenna positions), respectively, the UL CC may differ from each other in channel quality due to mobility of a user equipment or interference with a neighbor cell.

DISCLOSURE OF THE INVENTION

Technical Task

However, since it may be unable to exclude a case that a random access preamble is transmitted to a base station on UL CC of a poor channel quality according to a conventional PRACH resource selecting method, the probability of success in a random access process is lowered, whereby a delay time is increased in case of an initial access of a user equipment, a handover of a user equipment or the like.

A technical task of the present invention is to reduce a delay time in a manner of performing a random access process in consideration of channel qualities of UL CCs in using carrier aggregation.

Technical Solution

To achieve these and other advantages and in accordance with the purpose of the present invention, as embodied and broadly described, according to an embodiment of the present invention, a method of performing a random access procedure by a user equipment to a base station in a multi-carrier supporting wireless communication system may comprise: determining an uplink component carrier having a highest channel quality by measuring channel quality of at least one uplink component carrier; selecting a physical random access channel (PRACH) resource on the uplink component carrier having the highest channel quality; and transmitting a random access preamble to the base station using the selected PRACH resource.

Preferably, the determining the uplink component carrier having the highest channel quality comprises measuring a channel quality of at least one downlink component carrier corresponding to the at least one uplink component carrier.

More preferably, the determining the uplink component carrier having the highest channel quality further comprises determining the uplink component carrier corresponding to the downlink component carrier having a smallest pathloss among the at least one downlink component carrier.

Preferably, the selecting the PRACH resource comprises selecting a next available subframe on time domain from subframes including PRACH on the uplink component carrier having the highest channel quality.

Preferably, the transmission of the random access preamble comprises an initial transmission of the random access preamble or a retransmission of the random access preamble.

Preferably, wherein the at least one uplink component carrier of which channel quality is measured comprises uplink component carrier for which the PRACH resource is set.

To further achieve these and other advantages and in accordance with the purpose of the present invention, according to another embodiment of the present invention, a user equipment performing a random access procedure to a base station in a multi-carrier supporting wireless communication system may comprise: a processor comprising, a medium access control (MAC) layer module controlling a signal transmission on at least one uplink component carrier and a signal reception on at least one downlink component carrier; and a physical layer module functionally connected with the MAC layer module, the physical layer module performing the signal transmission on the at least one uplink component carrier and the signal reception on the at least one downlink component carrier, wherein the processor is configured to: determine an uplink component carrier having a highest channel quality by measuring channel quality of the at least one uplink component carrier; select a physical random access channel (PRACH) resource on the uplink component carrier having the highest channel quality via the MAC layer module; and transmit a random access preamble to the base station via the physical layer module using the selected PRACH resource.

Preferably, the processor is further configured to determine the uplink component carrier having the highest channel quality by measuring a channel quality of at least one downlink component carrier corresponding to the at least one uplink component carrier.

More preferably, the processor is further configured to determine the uplink component carrier having the highest channel quality by determining the uplink component carrier corresponding to the downlink component carrier having a smallest pathloss among the at least one downlink component carrier.

Preferably, the processor is further configured to select the PRACH resource through the MAC layer module by selecting a next available subframe on time domain from subframes including PRACH on the uplink component carrier having the highest channel quality.

Preferably, the transmission of the random access preamble comprises an initial transmission of the random access preamble or a retransmission of the random access preamble.

Preferably, the at least one uplink component carrier of which channel quality is measured comprises uplink component carrier for which the PRACH resource is set.

The above-mentioned general description for the present invention and the following details of the present invention may be exemplary and are provided for the additional description for the inventions in the appended claims.

Advantageous Effects

According to each embodiment of the present invention mentioned in the foregoing description, when a user equipment performs a random access process using a plurality of UL CCs, the probability of success in the random access process is raised and a delay time is reduced.

Effects obtainable from the present invention are non-limited by the above mentioned effect. And, other unmentioned effects can be clearly understood from the following description by those having ordinary skill in the technical field to which the present invention pertains.

BEST MODE FOR INVENTION

Figure 1:
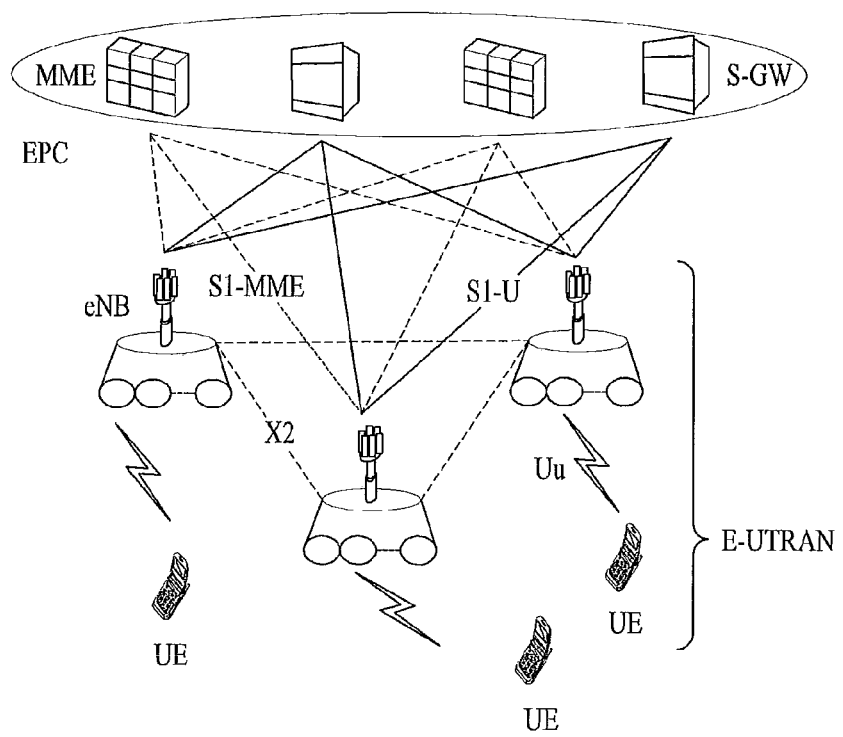
FIG. 1 is a diagram for a structure of a wireless communication system.

First of all, the following embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

In the following description, specific terminologies used for embodiments of the present invention are provided to help the understanding of the present invention. And, the use of the specific terminology may be modified into another form within the scope of the technical idea of the present invention.

Occasionally, to prevent the present invention from getting vaguer, structures and/or devices known to the public may be skipped or represented as block diagrams centering on the core functions of the structures and/or devices. Wherever possible, the same reference numbers will be used throughout the drawings to refer to the same or like parts in this specification.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/ GPRS/EDGE (Global System for Mobile communications)/ General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP ($3^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE. WiMAX may be explained by IEEE 802.16e standard (e.g., WirelessMAN-OFDMA reference system) and advanced IEEE 802.16m standard (e.g., WirelessMAN-OFDMA advanced system). For clarity, the following description mainly concerns 3GPP LTE and LTE-A standards, by which the technical idea of the present invention may be non-limited.

LTE System Structure

A system structure of LTE system is described for one example of a wireless communication system, to which the present invention is applicable, with reference to FIG. 1 as follows. LTE system is a mobile communication system evolved from UMTS system. Referring to FIG. 1, an LTE system structure may be mainly divided into E-UTRAN (evolved UMTS terrestrial radio access network) and EPC (evolved packet core). The E-UTRAN includes UE (user equipment) and eNB (evolved NodeB: base station). Uu interface connects the UE and the eNB together. And, X2 interface connects eNBs together. The EPC includes MME (mobility management entity) responsible for a control plane function and S-GW (serving gateway) responsible for a user plane function. S1-MME interface connects the eNB and the MME together and S1-U interface connects the eNB and the S-GW together. Particularly, theses 2 interfaces may be called S1 interface overall.

Figure 2:
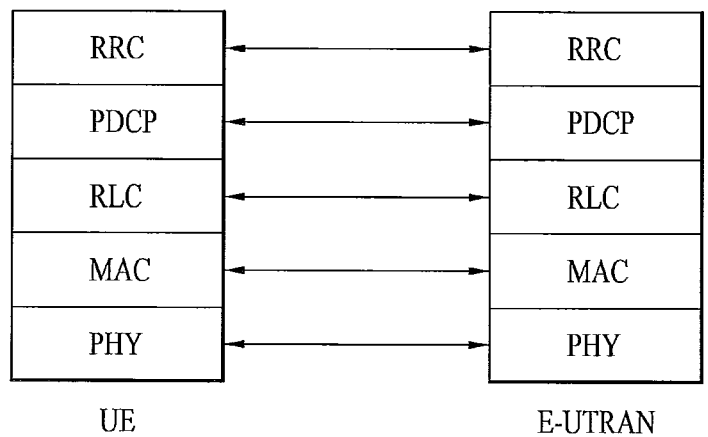
FIG. 2 is a diagram for a control plane of a radio protocol.
Figure 3:
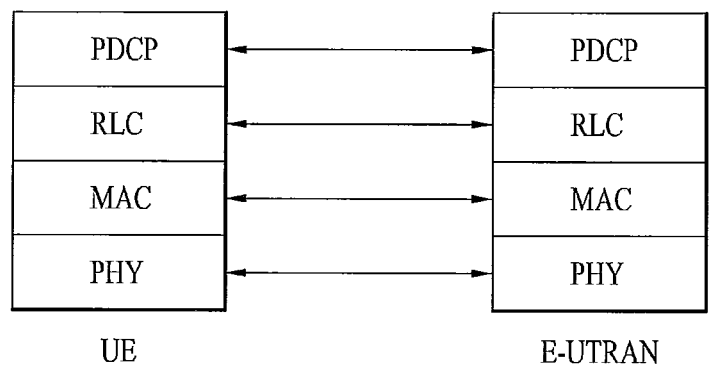
FIG. 3 is a diagram for a user plane of a radio protocol.

A radio interface protocol is defined in the Uu interface as a radio interval. The radio interface protocol horizontally includes a physical layer, a data link layer and a network layer or vertically includes a user plane for user data transport and a control plane for signaling (e.g., control signal) delivery. The above-mentioned radio interface protocol may be generally divided into L1 ($1^{st}$ layer) including a physical layer PHY, L2 ($2^{nd}$ layer) including MAC/RLC/PDCP layer, and L3 ($3^{rd}$ layer) including RRC layer, as shown in FIG. 2 and FIG. 3, based on the 3 lower layers of the OSI (open system interconnection) standard model widely known to the communication systems. These layers exist as pairs in UE and E-UTRAN, respectively, and are responsible for the data transport of the Uu interface.

The respective radio protocol layers are described with reference to FIG. 2 and FIG. 3 as follows. FIG. 2 is a diagram for a control plane of a radio protocol. FIG. 3 is a diagram for a user plane of a radio protocol.

A physical (PHY) layer, which is a $1^{st}$ layer, provides an information transfer service to a higher layer using a physical channel. The PHY layer is connected to a medium access control (MAC) layer on an upper side via a transport channel. And, data is transferred between the MAC layer and the PHY layer via this transport channel. In this case, transport channels may be categorized into a dedicated transport channel and a common transport channel in accordance with whether a channel is shared. And, data is transferred between different PHY layers, and more particularly, between a PHY layer of a transmitting side and a PHY layer of a receiving side via a physical channel using a radio resource.

Various kinds of layers exist in a $2^{nd}$ layer. First of all, a medium access control (MAC) layer plays a role in mapping various logical channels to various transport channels and also plays a logical channel multiplexing role in mapping several logical channels to one transport channel. The MAC layer is connected with a radio link control (RLC) layer, which is a higher layer, via a logical channel. And, logical channels can be mainly categorized into a control channel for carrying information of a control plane and a traffic channel for carrying information of a user plane, in accordance with a type of carried information.

RLC layer of the $2^{nd}$ layer plays a role in adjusting a data size suitable for a lower layer to transmit data via a radio section by performing segmentation and concatenation on data received from a higher layer. In order to secure various kinds of QoS required for each radio bearer (RB), the RLC layer provides 3 kinds of operating modes, i.e., a transparent mode (TM), an un-acknowledged mode (UM) and an acknowledged mode (AM). In particular, AM RLC performs a retransmission function via ARQ (automatic repeat and request) function for reliable data transmission.

A packet data convergence protocol (PDCP) layer of the $2^{nd}$ layer performs a header compression function of reducing an IP packet header size containing relatively large and unnecessary control information to efficiently transmit such IP packet as IPv4 packet, IPv6 packet and the like on a radio section having a narrow bandwidth. This plays a role in increasing transmission efficiency of a radio section by enabling information mandatory for a header part of data to be transmitted. In LTE system, PDCP layer performs a security function as well, which includes ciphering for preventing data interception by a third party and integrity protection for preventing data manipulation by a third party.

A radio resource control (RRC) layer, which is situated at a most upper part of a $3^{rd}$ layer, is defined in a control plane only and is responsible for controlling logical channels, transport channels and physical channels in association with configuration, re-configuration and release of radio bearers (RBs). In this case, a radio bearer (RB) means a logical path provided by $1^{st}$ and $2^{nd}$ layers of a radio protocol for a data delivery between a user equipment and UTRAN. If RB is set, it may generally mean a process for providing properties of a radio protocol layer and channel required for providing a specific service and setting a parameter and an operating method in detail. RB may be categorized into SRB (signaling RB) and DRB (data RB). In particular, the SRB is used as a passage for sending RRC message in a control plane and the DRB is used as a passage for transferring user data in a user plane.

Carrier Aggregation Technology

Figure 4:
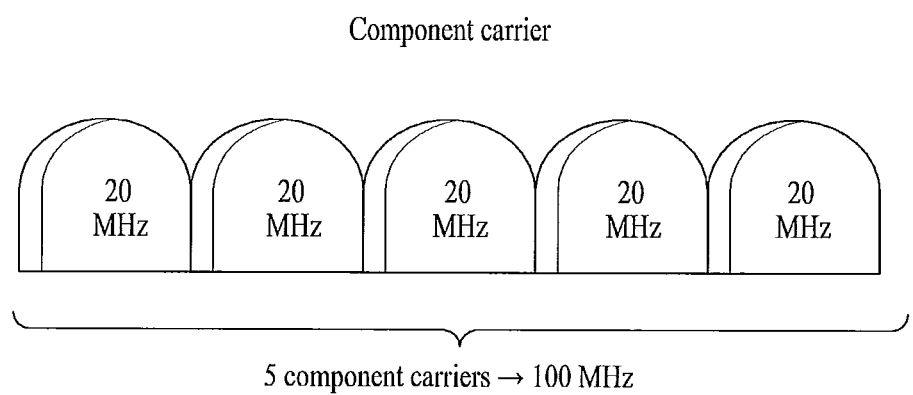
FIG. 4 is a diagram for carrier aggregation.

Carrier aggregation technology for supporting multiple carriers is described with reference to FIG. 4 as follows.

As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

UL/DL L2 Structure in Consideration of Carrier Aggregation Technology

Figure 5:
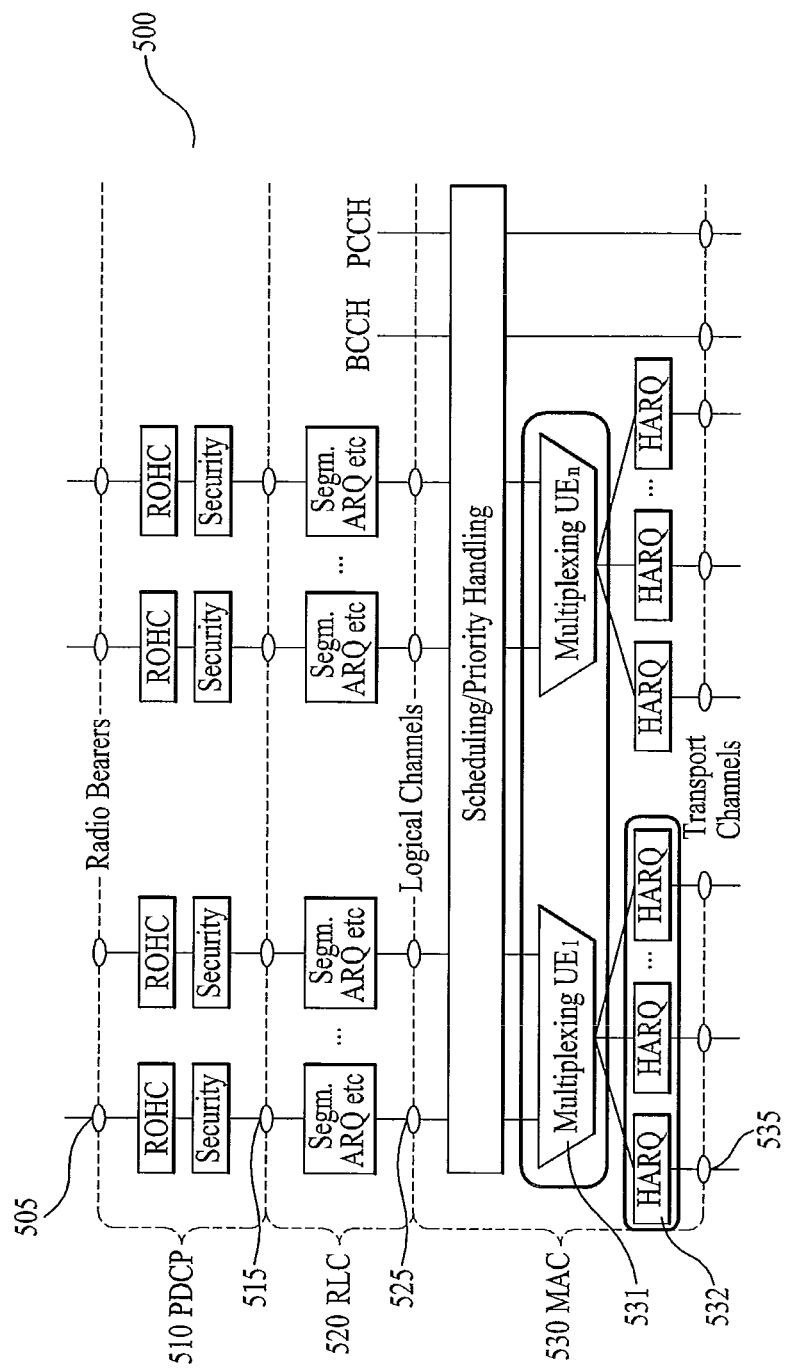
FIG. 5 is a diagram for a structure of downlink L2 ($2^{nd}$ layer) in carrier aggregation.
Figure 6:
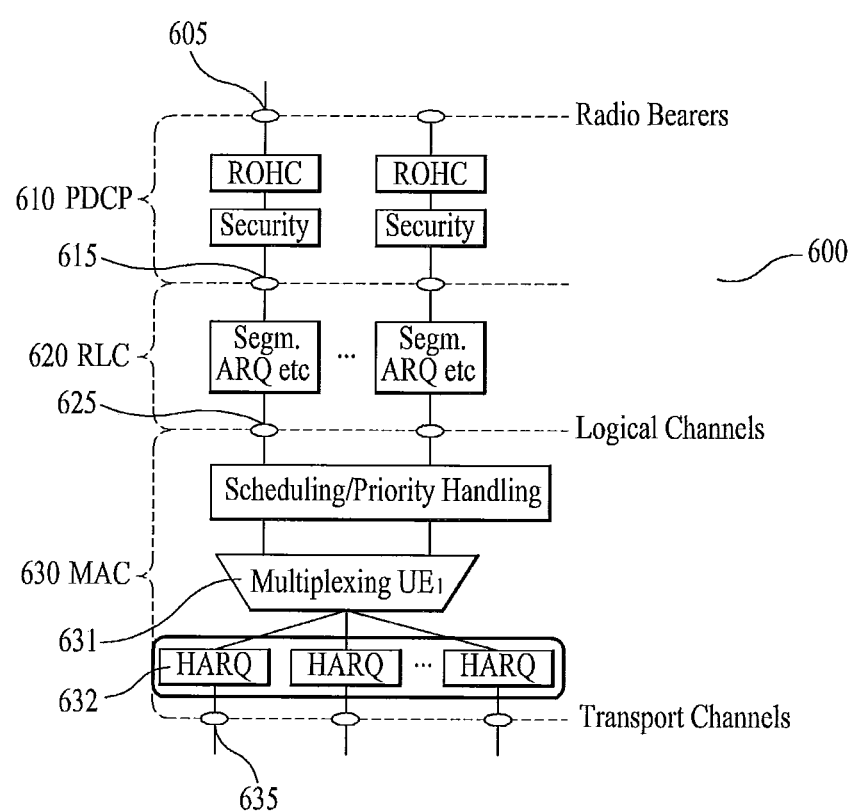
FIG. 6 is a diagram for a structure of uplink L2 ($2^{nd}$ layer) in carrier aggregation.

A structure of L2 ($2^{nd}$ layer) is described with reference to FIG. 5 and FIG. 6 as follows. FIG. 5 is a diagram for a structure of downlink L2 ($2^{nd}$ layer) in carrier aggregation. And, FIG. 6 is a diagram for a structure of uplink L2 ($2^{nd}$ layer) in carrier aggregation.

In a DL L2 structure 500 shown in FIG. 5, layers of PDCP 510, RLC 520 and MAC 530 are represented. In FIG. 5, elements 505, 515, 525 and 535 provided to interfaces between the layers indicate service access points (SAP) for peer-to-peer communications. The SAP between PHY channel (not shown in the drawing) and the MAC layer provides a transport channel [535]. And, the SAP between the MAC layer and the RLC layer provides a logical channel [525]. General operations of the respective layers are as good as mentioned in the foregoing description.

The MAC layer multiplexes a plurality of logical channels (i.e., radio bearers) from the RLC layer. In the DL L2 structure, a plurality of entities 531 of the MAC layer are related to the application of MIMO (multiple input multiple output) technology. Since one transport channel is generated by multiplexing a plurality of logical channels in case of non-MIMO in a system that does not consider carrier aggregation technology, one HARQ (hybrid automatic repeat and request) entity is provided to one multiplexing entity 531 [not shown in the drawing].

On the other hand, in a system that considers carrier aggregation technology, a plurality of transport channels corresponding to a plurality of component carriers are generated. Regarding this, in the carrier aggregation technology, one HARQ entity 532 manages one component carrier. Hence, the MAC layer 530 of the system, which supports the carrier aggregation technology, provides one multiplexing entity 531 with a plurality of HARQ entities 532 and performs operations related to them. Since each of the HARQ entities 532 handles transport block independently, a plurality of transport blocks may be simultaneously transmitted/received via a plurality of component carriers.

The UL L2 structure 600 shown in FIG. 6 performs the same operations of the DL L2 structure 500 shown in FIG. 5 except that one multiplexing entity 630 is included in one MAC layer 630. In particular, a plurality of HARQ entities 632 are provided for a plurality of component carriers, operations related to a plurality of the HARQ entities 632 are performed in the MAC layer 630, and a plurality of transport blocks can be simultaneously transmitted/received via a plurality of the component carriers.

Random Access Procedure

In the following description, a random access procedure performed in LTE system and a case of performing the random access procedure in a system having carrier aggregation (CA) technology applied thereto are explained in detail.

In LTE system, a user equipment may be able to perform a random access procedure in one of the following cases.

The user equipment performs an initial access without a connection (e.g., RRC connection) with a base station.

The user equipment initially accesses a target cell in a handover procedure.

The random access procedure is requested by a command from a base station.

In a situation that time synchronization of uplink is not matched or that a designated radio resource used to request a radio resource is not allocated, data in uplink is generated.

A recovery procedure is performed in case of radio link failure or handover failure.

In LTE system, a base station allocates a dedicated random access preamble designated to a specific user equipment. And, the user equipment provides a non-contention based random access procedure for performing a random access procedure using the random access preamble. In particular, in a process for selecting a random access preamble, there are a contention based random access procedure for a user equipment to select and use a random one from a specific set and a non-contention based random access procedure for using a random access preamble allocated to a specific user equipment by a base station only. The above two kinds of the random access procedures differ from each other in occurrence of collision problem. Besides, the non-contention based random access procedure is usable only in the above-mentioned handover procedure or only if requested by the command from the base station.

Figure 7:
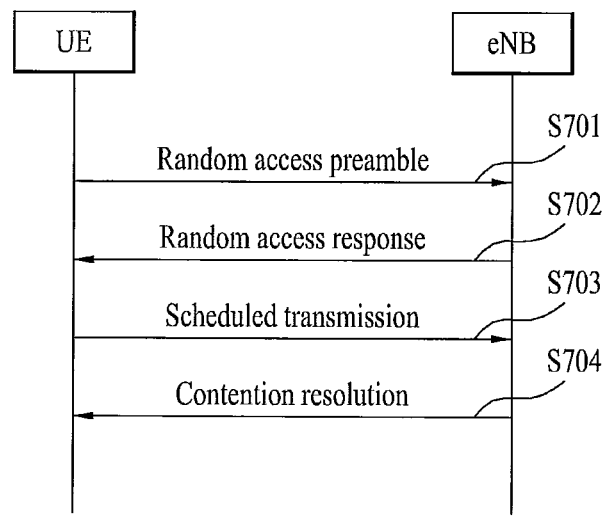
FIG. 7 is a diagram for describing an operating process between a user equipment and a base station in a contention based random access procedure.

FIG. 7 is a diagram for describing an operating process between a user equipment and a base station in a contention based random access procedure.

(1) $1^{st}$ Message Transmission

First of all, a user equipment randomly selects a random access preamble from a set of random access preambles indicated by system information or a handover command, selects a PRACH (physical RACH) resource for carrying the random access preamble, and then transmits the random access preamble via the selected PRACH resource [S701].

(2) Message Reception

After the user equipment has transmitted the random access preamble in the step S701, the user equipment attempts a reception of its random access response in a random access response receiving window indicated by a base station through the system information or the handover command [S702]. In particular, the random access response information may be transmitted in format of MAC PDU. And, the MAC PDU may be carried on PDSCH (physical downlink shared channel). In order to receive the information carried on the PDSCH, the user equipment preferably monitors PDCCH (physical downlink control channel). In particular, information on a user equipment necessary to receive the PDSCH, a frequency and time information of a radio resource of the PDSCH, a transmission format of the PDSCH and the like may be preferably included in the PDCCH. Once the user equipment succeeds in the reception of the PDCCH transmitted to the user equipment, it may be able to appropriately receive a random access response carried on the PDSCH in accordance with the informations of the PDCCH. And, a random access preamble identifier (ID) (e.g., RAPID (random access preamble identifier), a UL grant indicating a UL radio resource, a temporary cell identifier (temporary C-RNTI), time synchronization correction value (timing advance command (TAC)) and the like can be included in the random access response.

As mentioned in the foregoing description, the random access preamble identifier is required for the random access response. Since random access response information for at least one or more user equipments may be included in one random access preamble, it may be necessary to indicate the UL grant, the temporary cell identifier and the TAC are valid for which user equipment. In this step, assume that the user equipment selects a random access preamble identifier matching the random access preamble selected by the user equipment in the step S502. Through this, the user equipment may be able to receive a UL grant, a temporary cell identifier 9temporary C-RNTI), time synchronization correction value (timing advance command: TAC) and the like.

(3) $3^{rd}$ Message Transmission

If the user equipment receives the random access response valid for the user equipment, it may process the informations included in the random access response. In particular, the user equipment applies the TAC and saves the temporary cell identifier. Moreover, the user equipment may be able to save data, which is to be transmitted in response to the valid random access response, in a message-3 buffer.

Meanwhile, using the received UL grant, the user equipment transmits data (i.e., a $3^{rd}$ message) to the base station [S703]. In the contention based random access procedure, a base station is unable to determine which user equipments perform the random access procedure. In order for resolve the contention later, the base station needs to identify a user equipment.

As a method of including an identifier of a user equipment, two kinds of methods have been discussed. According to a $1^{st}$ method, if a user equipment has a valid cell identifier already allocated by a corresponding cell prior to the random access procedure, the user equipment transmits its cell identifier via UL transmission signal corresponding to the UL grant. On the contrary, if the user equipment fails to receive the allocation of a valid cell identifier prior to the random access procedure, the user equipment transmits its unique identifier (e.g., S-TMSI, random ID (Random Id), etc.). In general, the unique identifier is longer than the cell identifier. If the user equipment transmits data corresponding to the UL grant, the user equipment initiates a contention resolution timer (hereinafter abbreviated CR timer).

(4) $4^{th}$ Message Reception

After the user equipment has transmitted the data including its identifier via the UL grant included in the random access response, the user equipment waits for an instruction from the base station for the contention resolution. In particular, the user equipment may attempt a reception of PDCCH to receive a specific message [S704]. As a method of receiving the PDCCH, two kinds of methods have been discussed. As mentioned in the foregoing description, if the $3^{rd}$ message transmitted in response to the UL grant uses a cell identifier as its identifier, the user equipment attempts a reception of PDCCH using its cell identifier. If the identifier is a unique identifier, the user equipment may be able to attempt a reception of PDCCH using a temporary cell identifier included in the random access response. Thereafter, in the former case, if the PDCCH is received via its cell identifier before expiration of the contention resolution timer, the user equipment determines that the random access procedure is normally performed and then ends the random access procedure. In the latter case, if PDCCH is received via a temporary cell identifier before expiration of the contention resolution timer, the user equipment checks data carried on PDSCH indicated by the PDCCH. If the unique identifier of the user equipment is included in a content of the data, the user equipment determines that the random access procedure is normally performed and then ends the random access procedure.

Figure 8:
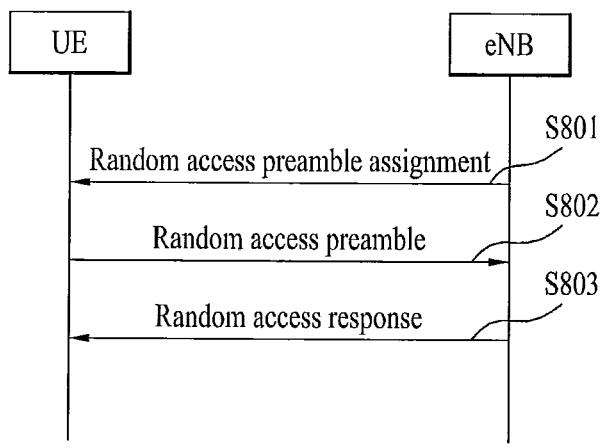
FIG. 8 is a diagram for describing an operating process between a user equipment and a base station in a non-contention based random access procedure.

FIG. 8 is a diagram for describing an operating process between a user equipment and a base station in a non-contention based random access procedure.

In an operation of a non-contention based random access procedure, unlike the contention based random access procedure shown in FIG. 7, a random access procedure is ended with a $1^{st}$ message transmission and a $2^{nd}$ message transmission only. Yet, before a user equipment transmits a random access preamble as a 1st message to a base station, the user equipment receives assignment of the random access preamble from the base station, transmits the assigned random access preamble as the 1st message to the base station, and then receives a random access response from the base station, whereby the random access procedure is ended.

A non-contention based random access procedure may be performed in case of a handover procedure or in case of being requested by a command from a base station. Of course, a contention based random access procedure may be performed in both of the above-mentioned cases.

(1) Random Access Preamble Assignment

A dedicated random access preamble having on possibility in contention is assigned for a non-contention based random access procedure from a base station. A random access preamble may be indicated by a base station via a handover command or a PDCCH command.

(2) The user equipment transmits the assigned random access preamble as a 1st message to the base station.

(3) A method of receiving random access response information is identical to a method in a contention based random access procedure.

In the following description, explained is a method for a user equipment to perform a random access procedure on a base station in CA (carrier aggregation) applied communication system according to one embodiment of the present invention.

As mentioned in the foregoing description, a carrier aggregation function set user equipment may be able to transmit/receive data to/from a base station via a plurality of uplink component carriers (UL CCs) and a plurality of downlink component carriers (DL CCs). And, a PRACH resource capable of carrying a random access preamble may be set for each of a plurality of the UL CCs. The PRACH resource may be set in time domain and frequency domain. This setting information on the PRACH resource may differ for each UL CC. Since the UL CCs use different frequencies (or antenna positions), a channel quality may differ for each UL CC due to mobility of a user equipment or interference with a neighbor cell.

According to a random access procedure in a legacy LTE system having carrier aggregation technology not applied thereto, a user equipment uses one UL CC only for a communication with a base station. Hence, in order to transmit a random access preamble to the base station, the user equipment uses a PRACH resource (e.g., subframe) closest on time among PRACH resources set for one UL CC. This may be named a time reference PRACH resource selecting method in the following description.

In particular, regarding the time reference PRACH resource selecting method, if a user equipment is requested to transmit a random access preamble at a timing t and PRACH resources are available in timing order of t+5, t+10, t+15 . . . in accordance with the setting information of the PRACH resource of UL CC, the user equipment selects the PRACH resource set for 't+5' closest on time (i.e., next available) and then transmits the random access preamble.

Meanwhile, in case of using the above-mentioned time reference PRACH resource selecting method in LTE-A system using a plurality of uplink component carriers (UL CCs) in accordance with the application of the carrier aggregation technology, the following scenarios may be taken into consideration.

(1) Assume that 2 UL CCs (hereinafter named UL CC_A and UL CC_B) are set for a user equipment having a carrier aggregation function.

(2) The user equipment is requested to perform a random access procedure by an initial access of the user equipment, a handover of the user equipment, a request made by a base station or the like. In this case, this timing is assumed as a time x.

(3) The user equipment performs a process for selecting PRACH resource for a transmission of a random access preamble.

(4) When the user equipment performs the selection of the PRACH resource, assume that a channel quality of UL CC_A is not better than that of UL CC_B or that the channel quality of UL CC_B is better than that of UL CC_A.

(5) Assume that the PRACH resource of UL CC_A is set for x+5, x+15, x+25 . . . on time. And, assume that the PRACH resource of UL CC_B is set for x+10, x+20, x+30 . . . .

(6) If the user equipment follows the time reference PRACH selecting method, the user equipment selects to use the PRACH resource of UL CC_A at the timing x+5 closest (next available) on time at the timing x for requesting a transmission of a random access preamble.

(7) Yet, since the channel quality of UL CC_A is not better than that of UL CC_B, the probability of failure in the random access procedure of the user equipment may be raised.

If the time reference PRACH selecting method is simply followed without considering different channel qualities of a plurality of UL CCs, the probability of success in the random access procedure is lowered to increase a delay time.

Figure 9:
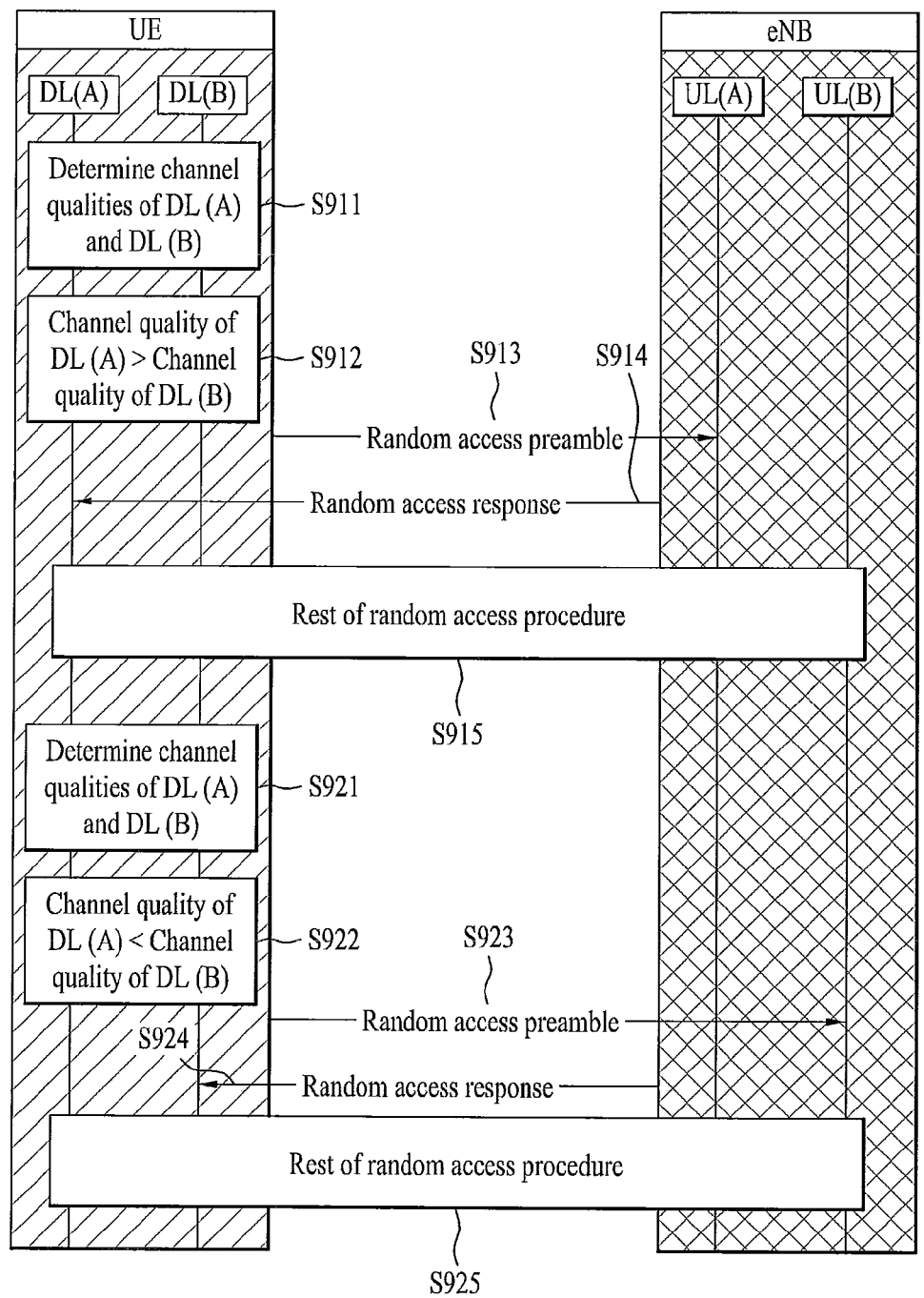
FIG. 9 is a diagram for describing a method of selecting PRACH resource from a plurality of UL CCs according to one embodiment of the present invention.

FIG. 9 is a diagram for describing a method of selecting PRACH resource from a plurality of UL CCs according to one embodiment of the present invention. According to the present embodiment, a user equipment capable of using a plurality of UL CCs may be able to select a PRACH resource for a random access preamble transmission in consideration of a channel quality of each of a plurality of the UL CCs.

Assume that a user equipment is set to use 2 UL CCs [hereinafter named UL (A) and UL (B)] and 2 DL CCs [hereinafter named DL (A) and DL (B)] for a carrier aggregation function from a base station. And, assume that PRACH resource is set to enable both of the UL (A) and the UL (B) to perform a random access procedure. Yet, the present invention may be non-limited by the number of UL/DL CCs set to 2. And, it may be apparent that the present invention is applicable to at least two or more UL/DL CCs.

In the following description, assume that the downlink component carriers DL (A) and DL (B) are located on different frequency bands, respectively (e.g., each component carrier in the non-contiguous carrier aggregation). Assume that the uplink component carriers UL (A) and UL (B) are located on different frequency bands, respectively. Assume that the UL (A) is 1-to-1 mapped to the DL (A) and that the UL (A) and the DL (A) are co-located on close frequency band. Assume that the UL (B) is 1-to-1 mapped to the DL (B) and that the UL (B) and the DL (B) are co-located on close frequency band. In other words, the UL (A) and the DL (A) form one pair, while the UL (B) and the DL (B) form another pair.

A user equipment is requested to perform a random access procedure in accordance with an initial access to a base station, a handover procedure, a command from the base station or the like. Accordingly, the user equipment may be able to perform a process for selecting PRACH resource to use in transmitting a random access preamble to the base station.

In a step S911, for a selection of PRACH resource, a user equipment may be able to determine channel qualities of UL CCs. In order to determine the channel quality of the UL CCs, it may be able to consider channel qualities of DL CCs respectively corresponding to the UL CCs. In particular, it may be able to measure a channel quality of DL (A) mapped to UL (A) and a channel quality of DL (B) mapped to UL (B). The channel qualities of the DL CCs may be determined from pathloss (PL) of the DL CCs.

The user equipment may be able to calculate a DL pathloss (PL) estimated value by dB unit from a reference signal transmitted power (ReferenceSignalPower) and a reference signal received power (RSRP) filtered by a higher layer for example. In particular, a DL pathloss may be calculated by a formula of 'PL=ReferenceSignalPower−higherlayer filtered RSRP'. The reference signal transmitted power may be provided to the user equipment by the higher layer. And, the RSRP may be determined from a linear average of power of resource elements carrying cell-specific reference signals within a corresponding measurement frequency band. Hence, the DL pathloss may have a different value in accordance with an obstacle on a DL path between the base station and the user equipment, a distance or the like. Details of the DL pathloss may refer to 3GPP standard documents (e.g., TS36.213, TS36.214, TS36.331, etc.). As the above description of the DL pathloss is just exemplary, a channel quality of DL may be measured in various ways.

From the above-calculated DL pathloss, it may be able to determine a channel quality of UL CC mapped to a corresponding DL CC. In particular, on the assumption that UL CC is 1-to-1 mapped to DL CC and is co-located with DL CC on a close frequency band, the pathloss of the DL CC may be interpreted as indicating the channel quality of the corresponding UL CC.

As a result of the step S911, if the channel quality of the DL (A) is determined as better than that of the DL (B) [S912], the user equipment may be able to use the PRACH resource of the UL (A) mapped to the DL (A) for a random access preamble transmission.

If the user equipment selects the UL (A) as a frequency resource for carrying the random access preamble, the user equipment may be able to select a next available PRACH resource (e.g., subframe) closest on time from PRACH resources of the UL (A) [not shown in the drawing].

Therefore, the user equipment selects one of a plurality of UL CCs based on a channel quality in frequency domain and may be then able to select PRACH resource existing in a next available subframe in time domain from PRACH resources of the selected UL CC. Using the selected PRACH resource on the UL (A), the user equipment may be able to transmit the random access preamble [S913].

Step S914 and step S915 may be performed in the same manner of the steps of the $2^{nd}$ message reception, the $3^{rd}$ message reception and the $4^{th}$ message reception of the previous random access response procedure. In particular, a random access response is received via the DL (A) from the base station [S914]. Thereafter, the rest of steps (e.g., a $3^{rd}$ message transmission and a $4^{th}$ message reception) of the random access procedure may be performed [S915].

According to another embodiment of the present invention, in selecting PRACH resource for carrying a random access preamble, UL CC having a next available PRACH resource (e.g., subframe) on time is selected from all available UL CCs set for a user equipment. And, it may be able to consider whether to select the PRACH resource on the corresponding UL CC finally in consideration of a pathloss of DL CC 1-to-1 mapped to the corresponding UL CC. For instance, if a next available PRACH resource (e.g., subframe) on time in each of UL (A) and UL (b) is allocated on the same time, it may be able to consider a channel quality of a corresponding UL CC in selecting which UL CC from the UL (A) and the UL (B).

In the following description, another embodiment of the present invention is explained with reference to the steps S921 to S925 shown in FIG. 9.

A user equipment may be able to measure channel qualities of DL CCs (e.g., DL (A) and DL (B)) mapped to UL CCs (e.g., UL (A) and UL (B)) [S921]. As a result, if the channel quality of the DL (B) is determined as better than that of the DL (A) [S922], the user equipment may be able to select the UL (B) mapped to the DL (B) as a frequency resource to use for a random access preamble transmission. Moreover, the user equipment selects a next available PRACH resource (e.g., subframe) on time from PRACH resources of the UL (B) and may be then able to transmit a random access preamble via the selected resource [S923]. The user equipment may receive a random access response via the DL (B) from the base station [S924] and may be then able to perform the rest of the steps (e.g., $3^{rd}$ message transmission and $4^{th}$ message reception) of the random access procedure [S925].

The random access preamble transmitting step of the step S923 may be a retransmission of the random access preamble. The retransmission of the random access preamble may be performed if the user equipment does not receive a $2^{nd}$ message (e.g., random access response) or a contention resolution is not successful.

The user equipment may be able to retransmit the random access preamble using UL CC different from the former UL CC used for the initial transmission of the random access preamble. According to the present embodiment, a channel quality of UL CC for a random access preamble retransmission is determined from a pathloss of DL CC matching the corresponding UL CC and a UL CC (e.g., UL CC matching a DL CC having a smallest pathloss) having a highest channel quality may be then selected for the random access preamble retransmission.

In selecting UL CC for a preamble retransmission, a user equipment calculates a preamble received target power (PREAMBLE_RECEIVED_TARGET_POWER) for all available UL CCs including PRACH resource and may be then able to compare it with a pathloss (PL) of DL CC. In particular, the user equipment calculates a formula of 'x=PREAMBLE_RECEIVED_TARGET_POWER−PL' and may be then able to select a UL CC having a highest x as a UL CC for the preamble retransmission.

According to the aforesaid various embodiments of the present invention, in selecting a PRACH resource for carrying a random access preamble from a plurality of UL CCs, a user equipment may be able to transmit (or retransmit) the random access preamble via one of a plurality of the UL CCs in consideration of a channel quality (e.g., determined from a pathloss of a corresponding DL CC) of UL CC and a next available PRACH resource on time.

Figure 10:
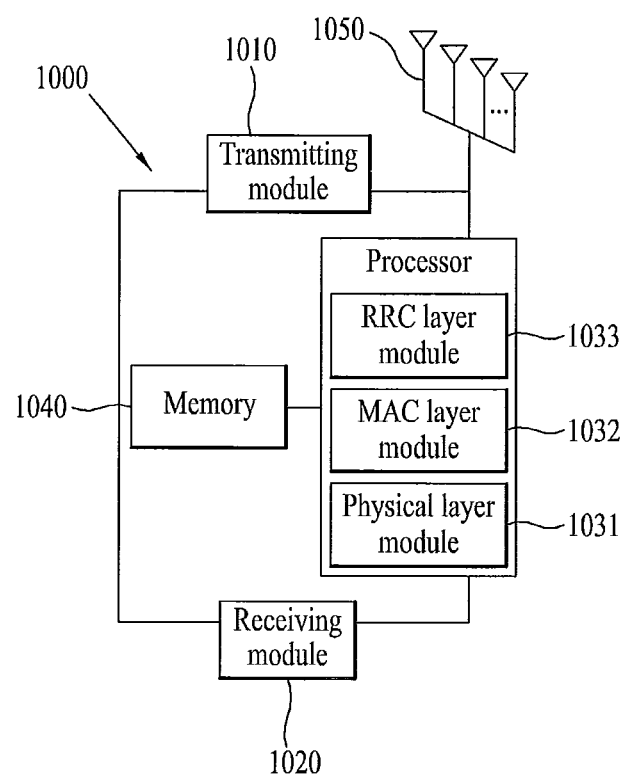
FIG. 10 is a diagram for describing a configuration of a user equipment device according to one embodiment of the present invention.

FIG. 10 is a diagram for describing a configuration of a user equipment device according to one embodiment of the present invention.

Referring to FIG. 10, a user equipment device 1000 may include a transmitting module 1010, a receiving module 1020, a processor 1030, a memory 1040 and an antenna 1050.

The transmitting module 1010 may be able to transmit various signals, data and information via at least one uplink component carrier to a base station. The receiving module 1020 1010 may be able to receive various signals, data and information via downlink component carrier to a base station. The processor 1030 controls transmissions and receptions of various signals, data and information via the receiving module 1010 and the transmitting module 1020 and may be able to control overall operations of the user equipment device 1000. The antenna 1050 may include a single antenna or a plurality of antennas. If a plurality of the antennas are provided to at least one of a transmitting side and a receiving side, it may be able to support MIMO (multiple input multiple output) transmission.

The processor 1030 may include a physical layer module 1031, a MAC layer module 1032 and an RRC layer module 1033.

The MAC layer module 1032 includes a plurality of HARQ entities respectively corresponding to a plurality of component carriers. The MAC layer module 1032 may be able to control a signal transmission on at least one uplink component carrier and a signal reception on at least one downlink component carrier via a plurality of the HARQ entities. And, the MAC layer module 1032 may be able to perform a random access resource selecting process in a random access procedure.

The physical layer module 1031 maps a transport channel from the MAC layer module 1032 to an uplink physical channel and then transmits it to a base station. The physical layer module 1031 receives a downlink physical channel from the base station, processes the received downlink physical channel, and may deliver it to the MAC layer module 1032 via the transport channel. The physical layer module 1031 is functionally connected with the MAC layer module 1032 and may be then able to perform a signal transmission on at least one uplink component carrier and a signal reception on at least one downlink component carrier. And, the physical layer module 1031 may be able to perform a transmission of a random access preamble using PRACH resource on an uplink component carrier.

The RRC layer module 1033 performs control functions of logical channels, transport channels and physical channels in association with configuration, re-configuration and release of radio bearers (RBs). In this case, the RB may mean a service provided by a $2^{nd}$ layer (e.g., MAC layer, RLC layer, PDCP layer) for data transfer between a user equipment and a base station. For this, the RRC layer module 1030 enables RRC message to be exchanged between the base station and the user equipment.

The processor 1030 of the user equipment device 1000 according to one embodiment of the present invention may be configured to determine an uplink component carrier having a highest channel quality by measuring channel qualities of at least one or more uplink component carriers. This determination can be made by measuring a channel quality of at least one downlink component carrier corresponding to at least one uplink component carrier. For instance, the processor 1030 may be configured to determine an uplink component carrier corresponding to a downlink component carrier having a smallest pathloss among at least one or more downlink component carriers as an uplink component carrier having a highest channel quality. The at least one or more uplink component carriers, of which channel qualities are measured, may include uplink component carriers for which PRACH resources are set, respectively.

The processor 1030 may be configured to select a physical random access channel (PRACH) resource on an uplink component carrier having a highest channel quality. For instance, the processor 1030 may be configured to select a next available subframe on time from subframes including the PRACH on the uplink component carrier having the highest channel quality as a physical random access channel (PRACH) resource.

In particular, the processor 1030 may be configured in a manner of selecting one of a plurality of uplink component carriers based on a channel quality in frequency domain and then selecting a PRACH existing in a next available subframe in time domain from PRACH resources of the selected uplink component carrier.

The processor 1030 may be configured to transmit a random access preamble using the PRACH resource on the above-selected uplink component carrier via the physical layer module 1031. This transmission of the random access preamble may include an initial transmission of a random access preamble or a retransmission of a random access preamble.

Besides, the processor 1030 may perform a function of operating information received by the user equipment, information to be externally transmitted by the user equipment and the like. The memory 1040 may be able to store the operated information for prescribed duration and may be substituted with such a component as a buffer (not shown in the drawing) and the like.

The above-described embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided in a manner of being implemented by those skilled in the art to which the present invention pertains. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the above-mentioned embodiments of the present invention are mainly described on the assumption of the 3GPP LTE series systems, by which the present invention may be non-limited. And, the present invention may be usable for a user equipment to perform a random access operation in various kinds of CA applied wireless communication systems in the same manner.

What is claimed is:

1. A method of performing a random access procedure by a user equipment to a base station in a multi-carrier supporting wireless communication system, the method comprising:
    determining an uplink component carrier having a next available physical random access channel (PRACH) resource being a first in time among PRACH resources of a plurality of uplink component carriers;
    selecting a PRACH resource on the uplink component carrier having the next available PRACH resource;
    transmitting a random access preamble to the base station using the selected PRACH resource; and
    determining an uplink component carrier having a highest channel quality by measuring channel quality of a first uplink component carrier and a second uplink component carrier, if both of the first and the second uplink component carriers have the next available PRACH resource on a same time position that are candidates for the selected PRACH resource.

2. The method of claim 1, wherein the determining the uplink component carrier having the highest channel quality comprises measuring a channel quality of a first and second downlink component carrier corresponding to the first and second uplink component carrier.

3. The method of claim 2, wherein the determining the uplink component carrier having the highest channel quality further comprises determining the uplink component carrier corresponding to the downlink component carrier having a smallest pathloss among the first and second downlink component carrier.

4. The method of claim 1, wherein the transmission of the random access preamble comprises an initial transmission of the random access preamble or a retransmission of the random access preamble.

5. The method of claim 1, wherein the plurality of uplink component carriers comprise an uplink component carrier for which the PRACH resource is set.

6. The method of claim 1, wherein the selected PRACH resource is the next available PRACH resource of the uplink component carrier having the highest channel quality.

7. A user equipment performing a random access procedure to a base station in a multi-carrier supporting wireless communication system, the user equipment comprising:
    a processor comprising,
    a medium access control (MAC) layer module controlling a signal transmission on at least one uplink component carrier and a signal reception on at least one downlink component carrier; and
    a physical layer module functionally connected with the MAC layer module, the physical layer module performing the signal transmission on the at least one uplink component carrier and the signal reception on the at least one downlink component carrier,
    wherein the processor is configured to:
        determine an uplink component carrier having a next available physical random access channel (PRACH) resource being a first in time among PRACH resources of a plurality of uplink component carriers;
        select a PRACH resource on the uplink component carrier having the next available PRACH resource via the MAC layer module;
        transmit a random access preamble to the base station via the physical layer module using the selected PRACH resource; and
        determine an uplink component carrier having a highest channel quality by measuring channel quality of a first uplink component carrier and a second uplink component carrier, if both of the first and the second uplink component carriers have the next available PRACH resource on a same time position that are candidates for the selected PRACH resource.

8. The user equipment of claim 1, wherein the processor is further configured to determine the uplink component carrier having the highest channel quality by measuring a channel quality of a first and second downlink component carrier corresponding to the first and second uplink component carrier.

9. The user equipment of claim 8, wherein the processor is further configured to determine the uplink component carrier having the highest channel quality by determining the uplink component carrier corresponding to the downlink component carrier having a smallest pathloss among the first and second downlink component carrier.

10. The user equipment of claim 7, wherein the transmission of the random access preamble comprises an initial transmission of the random access preamble or a retransmission of the random access preamble.

11. The user equipment of claim 7, wherein the plurality of uplink component carriers comprise an uplink component carrier for which the PRACH resource is set.

12. The user equipment of claim 7, wherein the selected PRACH resource is the next available PRACH resource of the uplink component carrier having the highest channel quality.

* * * * *